United States Patent
Fischer et al.

(10) Patent No.: US 9,318,979 B2
(45) Date of Patent: Apr. 19, 2016

(54) CONVERTER ARRANGEMENT HAVING A FILTER

(75) Inventors: Dieter Fischer, Möhrendorf (DE);
Alexander Hahn, Röttenbach (DE);
Uwe Krebs, Hirschaid (DE); Holger Leu, Uttenreuth (DE); Jean-Philippe Macary, Erlangen (DE); Andreja Rasic, Erlangen (DE); Wolfgang Weydanz, Buckenhof (DE)

(73) Assignee: Siemens Aktiengesellschaft, Munich (DE)

( * ) Notice: Subject to any disclaimer, the term of this patent is extended or adjusted under 35 U.S.C. 154(b) by 204 days.

(21) Appl. No.: 14/118,294

(22) PCT Filed: May 10, 2012

(86) PCT No.: PCT/EP2012/058606
§ 371 (c)(1),
(2), (4) Date: Nov. 27, 2013

(87) PCT Pub. No.: WO2012/156261
PCT Pub. Date: Nov. 22, 2012

(65) Prior Publication Data
US 2014/0104899 A1   Apr. 17, 2014

(30) Foreign Application Priority Data
May 18, 2011   (DE) .......................... 10 2011 076 039

(51) Int. Cl.
*G05F 1/00* (2006.01)
*H02M 1/12* (2006.01)
(Continued)

(52) U.S. Cl.
CPC ................ *H02M 7/72* (2013.01); *H02M 7/483* (2013.01)

(58) Field of Classification Search
USPC .................. 323/242; 363/40, 41, 65, 71, 132
See application file for complete search history.

(56) References Cited

U.S. PATENT DOCUMENTS

| 7,180,270 B2 * | 2/2007 | Rufer et al. ..................... 322/20 |
| 7,348,739 B2 * | 3/2008 | Urakabe et al. ............ 318/254.2 |

(Continued)

FOREIGN PATENT DOCUMENTS

| WO | 2010102667 A1 | 9/2010 |
| WO | 2010124706 A1 | 11/2010 |

OTHER PUBLICATIONS

Lesnicar A. et al., "An Innovative Modular Multilevel Converter Topology Suitable for Wide Power Range"; 2003; IEEE Bologna Power Tech Conference; Jun. 23 to 26, 2003; Bologna, Italy.

(Continued)

*Primary Examiner* — Adolf Berhane
*Assistant Examiner* — Gary Nash
(74) *Attorney, Agent, or Firm* — Laurence Greenberg; Werner Stemer; Ralph Locher

(57) ABSTRACT

A converter arrangement has at least one AC voltage connection, at which an alternating current can be fed in or drawn, and at least one DC voltage connection, at which a direct current can be fed in or drawn. The converter arrangement contains at least two series circuits connected in parallel. The external connections of the series circuits form the DC voltage connections of the converter arrangement. Each of the series circuits is connected in parallel and contains in each case at least two submodules connected in series, each of the submodules containing at least two switches and a capacitor. An energy store is to be connected to the capacitor of at least one of the submodules, wherein a filter is connected electrically between the capacitor and the energy store.

9 Claims, 2 Drawing Sheets

(51) Int. Cl.
*H02M 1/14* (2006.01)
*H02M 7/48* (2007.01)
*H02M 7/5387* (2007.01)
*H02M 7/72* (2006.01)
*H02M 7/483* (2007.01)

(56) References Cited

U.S. PATENT DOCUMENTS

| | | | | |
|---|---|---|---|---|
| 7,710,082 | B2* | 5/2010 | Escobar Valderrama et al. | 323/207 |
| 2007/0263422 | A1* | 11/2007 | Baudesson et al. | 363/132 |
| 2008/0304302 | A1* | 12/2008 | Wagoner et al. | 363/132 |
| 2010/0020576 | A1* | 1/2010 | Falk | 363/55 |
| 2011/0018481 | A1* | 1/2011 | Hiller | 318/400.26 |
| 2011/0019449 | A1* | 1/2011 | Katoh et al. | 363/124 |
| 2011/0058399 | A1* | 3/2011 | Honsberg et al. | 363/98 |
| 2012/0043816 | A1* | 2/2012 | Pereira | 307/64 |

OTHER PUBLICATIONS

Hagar A., "Generalized multi-cell voltage sourced converter Power Electronics and Applications"; 2009, EPE'09 13th European Conference Publication Year 2009, pp. 1-6; 2009; CA.

Slide presentation; Hans-Peter Nee, ISGT Europe Gothenburg Oct. 2010, Slide presentation IEEE PES; 2010.

Desconzi, M.I., et al., "Photovoltaic Stand-Alone Power Generation System with Multilevel Inverter"; IEEE Industrial Electronics, IECON 2006—32nd Annual Conference Publication Year: 2006, pp. 97-102; 2006.

Antonopolous, A., et al., "On dynamics and voltage control of the Modular Multilevel Converter"; Power Electronics and Applications, 2009. EPE '09. 13th European Conference Publication Year: 2009, pp. 1-10; 2009; SE.

* cited by examiner

CONVERTER ARRANGEMENT HAVING A FILTER

BACKGROUND OF THE INVENTION

Field of the Invention

The invention relates to a converter arrangement having at least one AC voltage connection, at which an alternating current can be fed in or drawn, and at least one DC voltage connection, at which a direct current can be fed in or drawn.

A converter arrangement of this type is known from the publication "An Innovative Modular Multilevel Converter Topology Suitable for Wide Power Range" (A. Lesnicar and R. Marquardt, 2003 IEEE Bologna Power Tech Conference, 23-26 Jun. 2003, Bologna, Italy). This previously known converter arrangement is a so-called Marquardt converter arrangement, which includes at least two series circuits which are connected in parallel, the outer terminals of which form DC voltage connections of the converter arrangement. Each of the series circuits connected in parallel includes in each instance at least two sub modules connected in series, each of which includes at least two switches and a capacitor. The voltage level at the DC voltage connections can be set by suitable activation of the switches.

BRIEF SUMMARY OF THE INVENTION

The object underlying the invention is to specify a converter arrangement, which can be used especially universally.

This object is achieved according to the invention by a converter arrangement having the features according to the independent claim. Advantageous embodiments of the inventive converter arrangement are specified in the sub claims.

Provision is made in accordance with the invention for an energy storage device to be connected to the capacitor of at least one of the sub modules, wherein a filter is connected electrically between the capacitor and the energy storage device.

One significant advantage of the inventive converter arrangement consists in this, contrary to previously known converter arrangements, having one or a number of additional connections, at which energy can be stored and/or buffered. This allows the converter arrangement to be used in technical systems in a particularly versatile fashion. For instance, the inventive converter arrangement can be used to distribute electrical energy, in other words as a type of energy distribution system or as a component of a complex energy distribution system, wherein energy buffering is enabled. The sub-modules of the inventive converter arrangement can be distributed spatially, for instance across an entire urban area and form local draw or feed-in points of the energy distribution system in order to draw and/or feed in electrical energy. The filter provided in accordance with the invention between the energy storage device and the capacitor (module capacitor) advantageously allows the energy storage device to be effectively protected from voltage fluctuations at the capacitor, which are produced indirectly or directly by the alternating voltage present at the AC voltage connection of the converter arrangement, as a result of which the service life of the energy storage device can be significantly increased.

The filter is preferably embodied such that it attenuates at least the fundamental frequency of the alternating voltage present at the AC voltage connection. Alternatively or in addition, the filter can attenuate at least the first and/or second harmonic of the alternating voltage present at the AC voltage connection.

The filter is preferably a low-pass filter or a band-pass filter, the limit frequency and/or upper limit frequency of which is lower than the fundamental frequency of the alternating voltage present at the AC voltage connection. With such an embodiment, the energy storage device is protected both from the fundamental frequency and the harmonics of the alternating voltage present at the AC voltage connection and also from the switching frequency of the control voltages present at the switches of the respective switching module. The switching frequency of the control voltages present at the switches of the respective switching module may lie in the kilohertz range for instance.

With efficient filtering in mind, it is considered to be advantageous if the limit frequency of the low-pass filter and/or the upper limit frequency of the band-pass filter is maximally as large as half of the fundamental frequency of the alternating voltage present at the AC voltage connection.

The filter may be an active or a passive filter. A passive filter may include for instance a simple throttle or a parallel oscillating circuit (anti-resonant circuit) with a corresponding bandwidth. An active filter may be embodied for instance as a PFC filter (efficiency factor correction filter) with active components. A number of these or comparable filter units or a combination of various filter topologies are possibly advantageous.

The energy storage capacity of the energy storage device is preferably at least 100 times the energy storage capacity of the capacitor, in order to allow for energy storage which extends clearly beyond the energy storage of the capacitor.

The energy storage device is preferably an electrochemical energy storage device, in particular a rechargeable battery.

In respect of the AC voltage connections of the converter arrangement, it is considered to be advantageous if each of the series circuits in parallel has an intermediate connection in each instance, which, in terms of potential, lies between two submodules of the respective series circuit, and each intermediate connection forms one of the AC voltage connections respectively.

The converter arrangement preferably operates in a multi-phase manner, e.g. in three-phase, and includes at least one series circuit with at least two sub modules which are connected in series respectively per phase.

The invention relates furthermore to an energy distribution system for supplying a supply area with electrical energy, wherein the energy distribution system comprises at least one connection for feeding in electrical energy and a plurality of connections for drawing the fed-in electrical energy.

In respect of such an energy distribution system, it is considered to be advantageous if the energy distribution system comprises a converter arrangement (as is described above), wherein the at least one connection of the energy distribution system is formed to feed in the electrical energy through a connection of the converter arrangement and at least one subset of the connections of the energy distribution system is formed to draw the fed-in electrical energy through connections of the sub modules of the converter arrangement and wherein at least one subset of the connections of the sub modules of the converter arrangement is used to store or buffer energy.

With regard to the advantages of the inventive energy distribution system, reference is made to the afore-cited advantages of the inventive converter arrangement, since the advantages of the inventive converter arrangement essentially correspond to those of the inventive energy distribution system.

It is considered to be advantageous if the sub modules are locally distributed by way of the supply area to be supplied with electrical energy by the energy distribution system. This allows relatively large supply areas, for instance entire urban areas, to be supplied with electrical energy with the aid of the sub modules.

A wind farm with a plurality of wind generators and a converter arrangement, as described above, is also considered to be inventive. The wind generators are preferably connected in each instance to a sub module of the converter arrangement.

A method for operating a converter arrangement, as described above, is also considered to be inventive. In accordance with the invention, electrical energy is drawn from the sub module at a connection of at least one of the sub modules and is buffered or buffered electrical energy is fed into the sub module.

The energy storage devices are preferably lithium-ion batteries, lithium iron phosphate batteries, lithium polymer batteries, Pb batteries, NiCd batteries, NiMH batteries, high temperature batteries, NaS batteries, ZEBRA batteries, sodium-air batteries, storage capacitors, double layer capacitors and/or hybrid capacitors.

The energy storage device can contain batteries in the form of battery packs, which each comprise individual cells which are connected in series or in parallel. In the case of cells connected in series, it is considered to be advantageous if battery management is integrated into the battery packs, said battery management allowing for safe operation of the battery pack in a predetermined temperature and voltage window. If predetermined turn-off conditions are achieved in such a case (energy storage device is fully charged or discharged, or a maximum or minimum voltage of the battery pack is reached), additional energy can be exchanged between the energy storage device and converter arrangement by way of a corresponding activation of the switches of the sub modules of the converter arrangement. To this end, the converter arrangement need only be operated as a conventional Marquardt module.

Furthermore, it is considered to be advantageous if the energy storage device or devices is/are each equipped with monitoring electronics which communicate with a superordinate unit. The superordinate unit can in such cases control the charging and/or discharging of the energy storage device depending on the energy situation of the converter arrangement.

The energy storage devices are preferably controlled using an individual control algorithm, in order to optimize the storage process. Furthermore, it is also considered to be advantageous if the energy storage devices are equipped with a preferably independently operating symmetry circuit.

BRIEF DESCRIPTION OF THE SEVERAL VIEWS OF THE DRAWING

The invention is subsequently explained in more detail with the aid of exemplary embodiments, in which, by way of example

For the sake of clarity, the same reference characters are always used in the figures for identical or comparable components.

DESCRIPTION OF THE INVENTION

Figure 1:
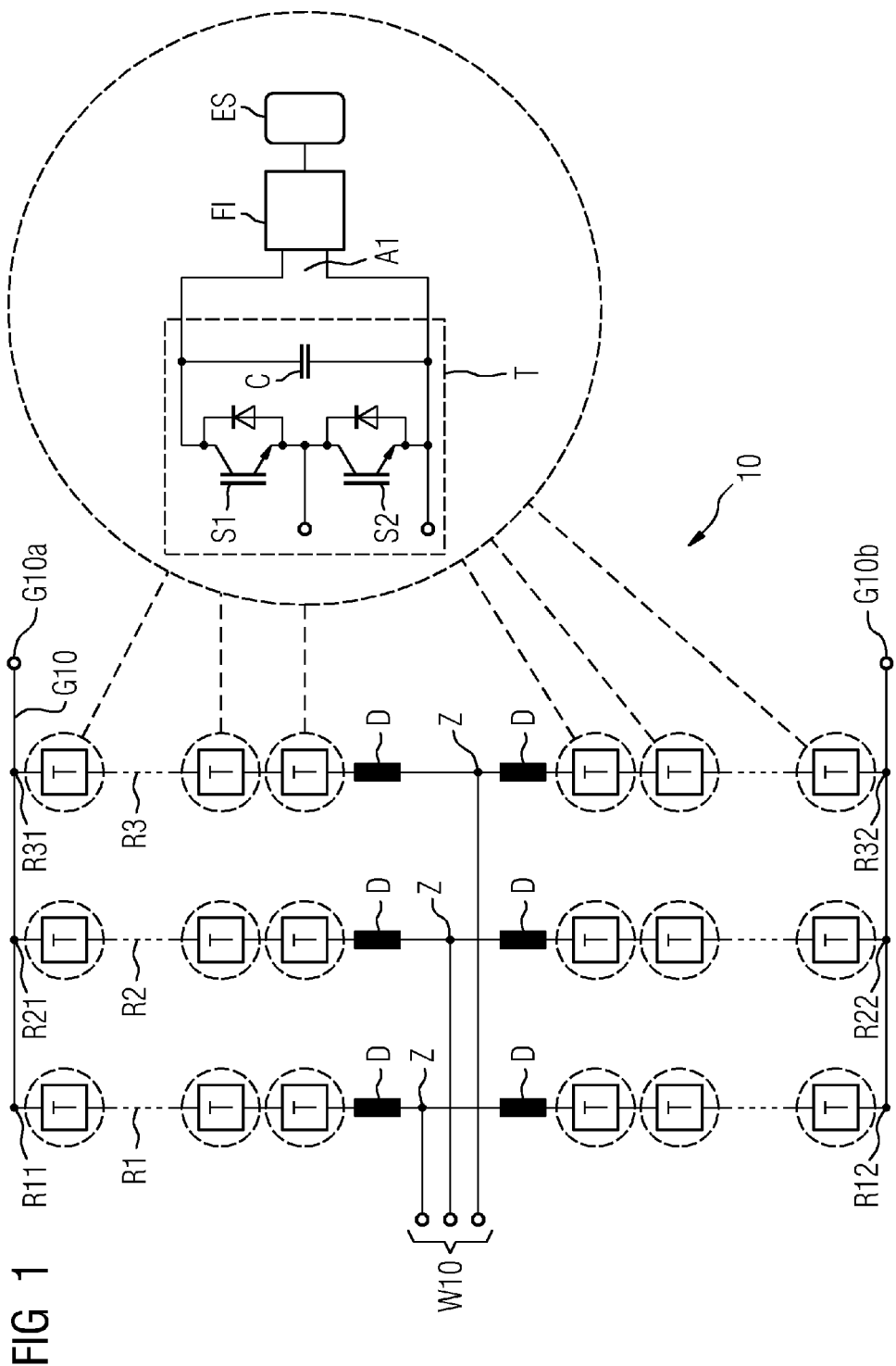
FIG. 1 shows an exemplary embodiment of an inventive converter arrangement and FIG. 2 shows an exemplary embodiment of an inventive energy distribution system, which is equipped with an inventive converter arrangement.

An exemplary embodiment of a three-phase converter arrangement 10 is shown in FIG. 1. This includes AC voltage connections W10 for feeding in alternating current. Furthermore, it is equipped with a DC voltage side G10, which includes two DC voltage connections G10a and G10b.

The converter arrangement 10 comprises three series circuits R1, R2 and R3 which are connected in parallel, the outer connections R11, R21 and R31 of which are connected to the DC voltage connection G10a. The outer connections R12, R22 and R32 are connected to the DC voltage connection G10b on the DC voltage side G10. In other words, the outer connections of the three series circuits R1, R2 and R3 form the DC voltage side G10 of the converter arrangement 10.

Each of the three series circuits R1, R2 and R3 is equipped in each instance with six series-connected sub modules T and two inductors D. An intermediate connection Z is disposed between the two inductors D, said intermediate connection Z, in terms of potential, lying between the upper three sub modules in FIG. 1 and the lower three sub modules in FIG. 1 and forming one of the three AC voltage connections W10 of the converter arrangement 10.

By way of example, the structure of the sub modules T can be seen in FIG. 1. In the exemplary embodiment according to FIG. 1, each of the sub modules T comprises two switches S1 and S2 and a capacitor C respectively. The connection contacts of the capacitor C of the sub module T form a connection A1 of the sub module, at which electrical energy can be drawn from the sub module T or fed into the sub module. Direct current can be fed in or drawn at the connection A1.

A filter FI and an energy storage device ES can be connected to the capacitor C and/or to the connection A1 of one or a number of the sub modules T, as indicated in the dashed circle in FIG. 1. The energy storage device ES is used to store and/or buffer energy, which, in the case of corresponding activation of the switches S1 and S2, is drawn from the converter arrangement 10 by way of the respective sub module T. The energy stored in the energy storage device can also be fed back into the converter arrangement 10 at any time by way of the respective sub module T, by the switches S1 and S2 being activated accordingly.

In order to activate the switches S1 and S2, a module-individual or a central control facility is preferably provided, which is not shown in FIG. 1 for reasons of clarity. If electrical energy is to be stored in the energy storage device ES, the switches S1 and S2 are activated accordingly such that energy flows in the direction of the switches S1 and S2. If electrical energy is to be drawn from the energy storage device ES, the switches S1 and S2 are activated accordingly such that energy flows in the direction of the energy storage device ES.

The filter FI is preferably embodied such that it attenuates at least the fundamental frequency of the alternating voltage present at the AC voltage connection, as well as its first and second harmonic. The filter FI thus protects the assigned energy storage device from a periodic charging and discharging with the frequency (or a multiple thereof) of the alternating voltage present at the AC voltage connection W10.

In summary, it allows the converter arrangement 10, on account of the embodiment of the sub modules T, to draw or feed in electrical energy at the connection A1 of each sub module T. The converter arrangement 10 can thus be used as an energy distribution system. If a filter FI and an energy storage device ES are connected to the connection A1, energy storage can further take place, in particular energy buffering.

Figure 2:
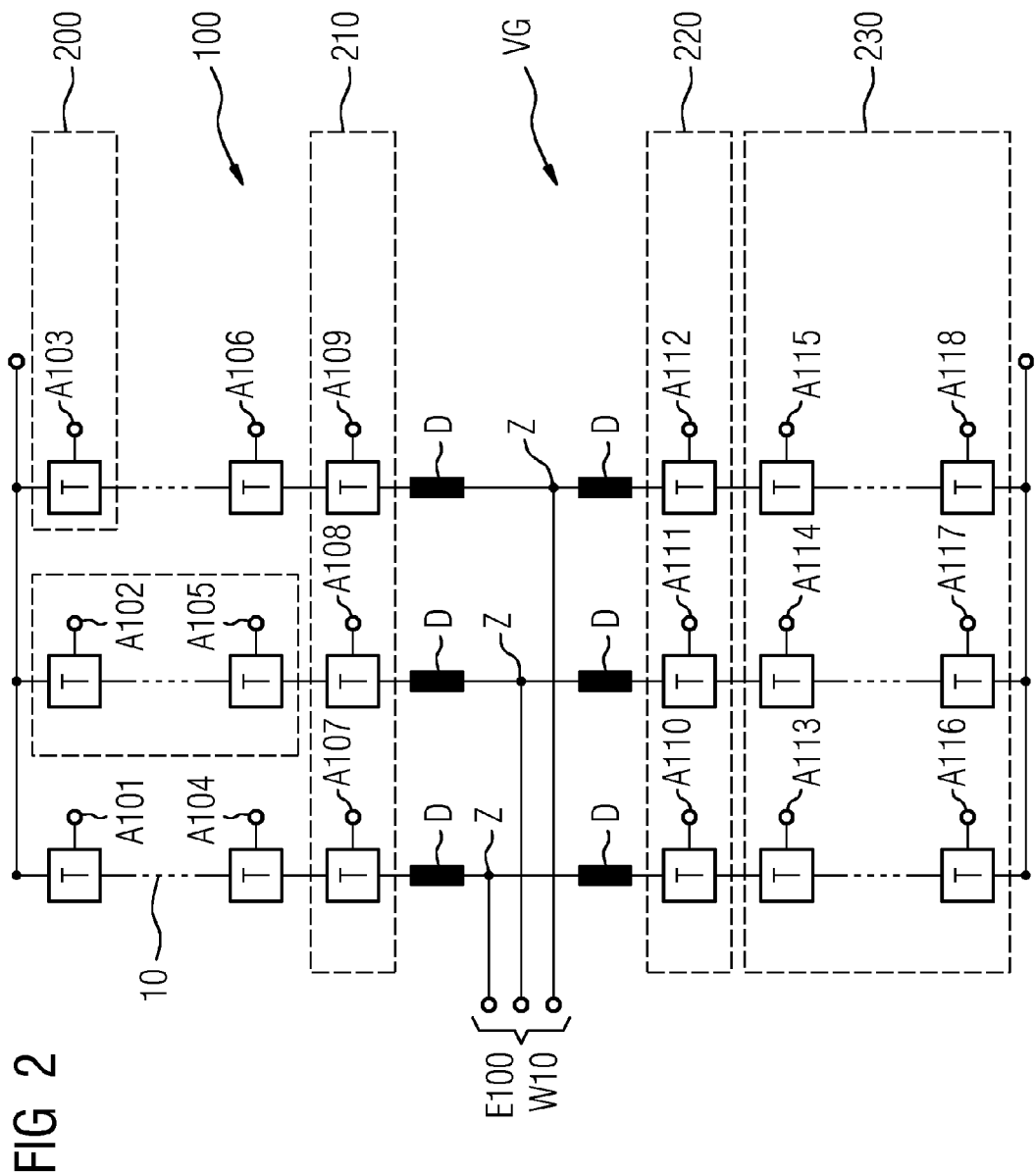

An exemplary embodiment of an energy distribution system 10 is shown by way of example in FIG. 2, said energy distribution system being formed by a converter arrangement 10, as was explained in conjunction with FIG. 1.

The energy distribution system 100 comprises a connection E100 to feed in electrical energy. In the exemplary embodiment according to FIG. 2, this connection E100 is formed by three AC voltage connections W10 of the converter arrangement 10.

The energy distribution system 100 further comprises a plurality of connections A101 to A118, which are suited to drawing and/or to feeding in and/or to storing/buffering electrical energy. These connections A101 to A118 are distributed spatially over a large local supply area VG, such as for instance an urban area. In the exemplary embodiment according to FIG. 2, the connection A101 belongs to a housing 200, which is disposed in the supply area VG. The connections A107, A108 and A109 are arranged in a small building complex 210 within the supply area VG. The connections A110, A111 and A112 belong to a power station 220, which supplies the local supply area VG with electrical energy. The connections A113 to A118 are assigned to a large building complex 230, which is likewise disposed within the supply area VG.

Each of the cited connections A101 to A118 of the energy distribution system 100 is formed by the connection A1 of one of the submodules T (cf. FIG. 1), as has been explained in detail in conjunction with the FIG. 1. In other words, it is therefore possible to draw or feed in electrical energy at each of the connections A101 to A118 or buffer to electrical energy, by energy being drawn, fed-in or stored at one or a number of the connections A1 of each sub module T.

Energy storage devices ES with individual filters FI can be connected to one or to several connections A101 to A118 in order to store or buffer energy, as was explained in conjunction with FIG. 1. Energy storage devices with individual filters are not shown in FIG. 2 for reasons of clarity.

Activation of the switches S1 and S2 of the sub modules T preferably takes place through a central control center, which is not shown in FIGS. 1 and 2 for reasons of clarity.

In summary, the converter arrangement 10 according to FIG. 1 and the energy distribution system 100 according to FIG. 2 enable for instance:
- a connection of decentralized feed-in units and microsystems,
- a formation of a high-performance medium or high voltage coupling (DC voltage and AC voltage are possible),
- a superordinate controller, as a result of which a high dynamic behavior of the overall system is enabled, and extended redundancy ability.

By way of example, the converter arrangement 10 according to FIG. 1 and the energy distribution system 100 enable the supply of many decentralized small units, which distribute across a large area. Therefore, individual houses in a narrower or wider urban area can be coupled to the medium or high voltage by way of the submodules and are supplied with low voltage.

Furthermore, a coupling of a number of converter arrangements and/or a number of energy distribution systems is also possible. Various energy distribution systems 100, as shown in FIG. 2, can thus be connected to one another for instance by way of their AC voltage connections W10. The advantage here is that it does not result in any appreciable increase in the short-circuit power. Alternatively, the converter arrangements and/or the energy distribution systems formed as a result can also be coupled to one another by way of the DC voltage connections.

In the event of a coupling of a number of converter arrangements and/or a number of energy distribution systems, a central switching system, which can control the entire arrangement, is preferably installed in the network.

The converter arrangement described in conjunction with FIGS. 1 and 2 can also be used as a feed-in inverter in the low, medium, high and highest voltage networks with integrated energy storage devices. Furthermore, it is possible to use the converter arrangement in network (short) couplings with an integrated energy storage device. The converter arrangement can also be used as a buffer for sensitive networks and/or processes, for instance in order to ensure a supply of a subnetwork, the primary feed-in of which has failed. Critical procedures or processes can thus be reliably transferred into a defined state using the described converter arrangement.

The converter arrangement can also be used for shore connections with optimal buffering and in solar inverters having an integrated storage device.

Furthermore, the converter arrangement can also be used as an energy storage/coupling device in an electric or hybrid means of transportation. In this case, charging can take place by the AC voltage connection of the converter arrangement being connected to an alternating voltage network. Movement of the means of transportation can be ensured by the AC voltage connection being connected to a drive motor and a useful buffering can take place by energy being fed back into the AC voltage network from the energy storage device.

The converter arrangement can also be used as a central charging station for energy storage devices, for instance rechargeable batteries. A switchable electrical isolation preferably exists in the charging station, in order to allow for an exchange of individual battery packs of the energy storage device or devices.

The converter arrangement 10 according to FIG. 1 and the energy storage system 100 according to FIG. 2 can also be used to couple wind turbines in wind farms with one another. For instance, a wind farm turbine can be connected to some sub modules of the converter arrangement 10 and/or the energy distribution system 100 according to FIGS. 1 and 2 respectively. Such a connection can take place by way of the turbine's integrated AC/DC converter, which is connected to the capacitor C of the respective sub module T. The filter outlay involved in the feeding-in of electrical energy generated by the wind turbines can be kept to a minimum so that converters with a very simple topology and very simple valves (e.g. in the form of thyristor converters) can be used as integrated AC/DC converters in turbines. In the simplest case, a diode rectifier can be used for instance. It is also conceivable to dispense with a transformer between the turbine's integrated AC/DC converter and the respective windpower generator. Also when feeding into the submodule T, no fixed feed-in frequency need be predetermined or retained, since each wind turbine can be operated with its own frequency. It is also very easily possible to shed individual wind turbines in the event of a fault, since the sub modules can operate independently of the operating points of the individual generators.

Although the invention was illustrated and described in detail by the preferred exemplary embodiments, the invention is not restricted by the disclosed examples and other variations can be derived herefrom by the person skilled in the art, without departing from the scope of protection of the invention.

The invention claimed is:

1. A converter configuration, comprising:
    at least one AC voltage connection at which an alternating current can be fed in or drawn;
    at least one DC voltage connection at which a direct current can be fed in or drawn;
    at least two series circuits connected in parallel and having external connections forming said at least one DC voltage connection, each of said series circuits connected in parallel containing in each case at least two sub modules connected in series, each of said sub modules containing at least two switches and a capacitor;

an energy storage device coupled to said capacitor of at least one of said sub modules; and a filter connected electrically between said capacitor and said energy storage device, said filter selected from the group consisting of a low-pass filter and a band-pass filter, said filter having at least one of a limit frequency or an upper limit frequency being lower than a fundamental frequency of an alternating voltage present at said at least one AC voltage connection, the limit frequency of said low-pass filter or the upper limit frequency of said band-pass filter is maximally as large as half of the fundamental frequency of the alternating voltage present at said at least one AC voltage connection.

2. The converter configuration according to claim 1, wherein said filter attenuates at least the fundamental frequency of the alternating voltage present at said at least one AC voltage connection.

3. The converter configuration according to claim 1, wherein said filter attenuates at least one of a first harmonic or a second harmonic of the alternating voltage present at said at least one AC voltage connection.

4. The converter configuration according to claim 1, wherein said filter is selected from the group consisting of active filters and passive filters.

5. The converter configuration according to claim 1, wherein said energy storage device has an energy storage capacitance being at least 100 times an energy storage capacitance of said capacitor.

6. The converter configuration according to claim 1, wherein said energy storage device is selected from the group consisting of an electrochemical energy storage device and a rechargeable battery.

7. The converter configuration according to claim 1, wherein the converter configuration operates in a multiphase fashion and includes, per phase, at least one said of said series circuits with in each instance at least two of said sub modules connected in series.

8. An energy distribution system for supplying a supply area with electrical energy, the energy distribution system comprising:

at least one connection for feeding in electrical energy;

a plurality of connections for drawing the electrical energy fed-in;

a converter configuration containing:

at least one AC voltage connection at which an alternating current can be fed in or drawn;

at least one DC voltage connection at which a direct current can be fed in or drawn;

at least two series circuits connected in parallel and having external connections forming said at least one DC voltage connection, each of said series circuits connected in parallel containing in each case at least two sub modules connected in series, each of said sub modules containing at least two switches and a capacitor;

an energy storage device coupled to said capacitor of at least one of said sub modules; and a filter connected electrically between said capacitor and said energy storage device, said filter selected from the group consisting of a low-pass filter and a band-pass filter, said filter having at least one of a limit frequency or an upper limit frequency being lower than a fundamental frequency of an alternating voltage present at said at least one AC voltage connection, the limit frequency of said low-pass filter or the upper limit frequency of said band-pass filter is maximally as large as half of the fundamental frequency of the alternating voltage present at said at least one AC voltage connection; and said at least one connection of said energy distribution system for feeding in the electrical energy is formed by said at least one AC voltage connection of said converter configuration, and at least one subset of said connections for drawing the electrical energy fed-in is formed by connections of said sub modules of said converter configuration and at least one subset of said connections of said sub modules of said converter configuration being used to store or buffer energy.

9. The energy distribution system according to claim 8, wherein said sub modules are locally distributed by way of the supply area to be supplied with the electrical energy by the energy distribution system.

\* \* \* \* \*